Figure 2B:
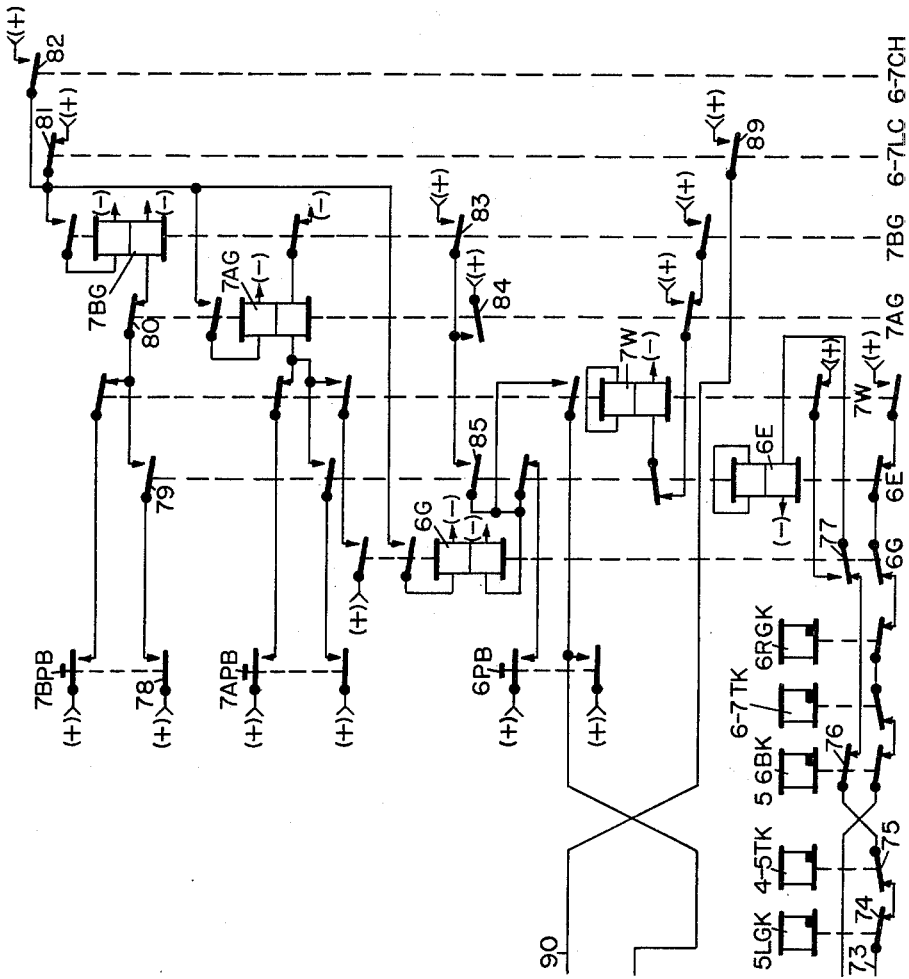

Nov. 7, 1961  W. R. SMITH  3,008,041
CENTRALIZED TRAFFIC CONTROL SYSTEM FOR RAILROADS
Filed April 20, 1956  6 Sheets-Sheet 1
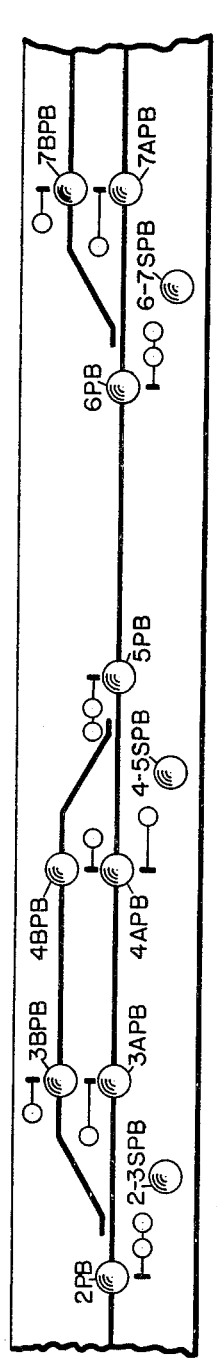
FIG. I.
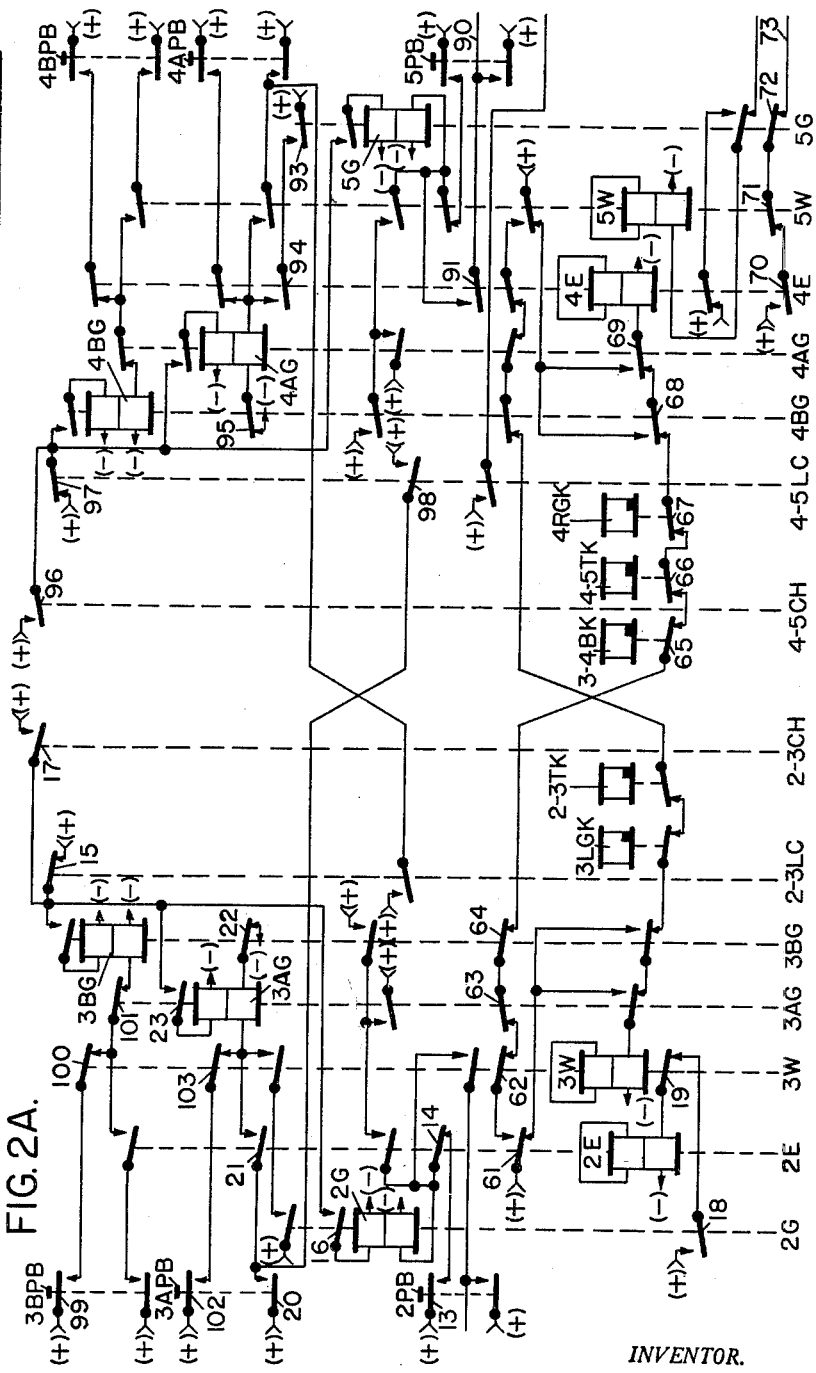
FIG. 2A.
INVENTOR.
W. R. SMITH
BY
Forest B. Hitchcock
HIS ATTORNEY Nov. 7, 1961 W. R. SMITH 3,008,041
CENTRALIZED TRAFFIC CONTROL SYSTEM FOR RAILROADS
Filed April 20, 1956 6 Sheets-Sheet 2

INVENTOR.
W. R. SMITH
BY
Forest B. Hitchcock
HIS ATTORNEY

Nov. 7, 1961 W. R. SMITH 3,008,041
CENTRALIZED TRAFFIC CONTROL SYSTEM FOR RAILROADS
Filed April 20, 1956 6 Sheets-Sheet 4

FIG. 2D.

INVENTOR.
W.R. SMITH
BY
Forest B. Hitchcock
HIS ATTORNEY

Nov. 7, 1961 W. R. SMITH 3,008,041
CENTRALIZED TRAFFIC CONTROL SYSTEM FOR RAILROADS
Filed April 20, 1956 6 Sheets-Sheet 6

INVENTOR.
W. R. SMITH
BY
HIS ATTORNEY

United States Patent Office 3,008,041
Patented Nov. 7, 1961

3,008,041
CENTRALIZED TRAFFIC CONTROL SYSTEM
FOR RAILROADS
Willis R. Smith, Rochester, N.Y., assignor to General
Railway Signal Company, Rochester, N.Y.
Filed Apr. 20, 1956, Ser. No. 579,683
6 Claims. (Cl. 246—5)

This invention relates to centralized traffic control systems for railroads, and it more particularly pertains to an improved means for the establishment of through routes in response to end-to-end designation.

In conventional centralized traffic control systems, the setting up of a route on single track through the section of track connected to one end of a passing siding and associated with a particular field station requires the manual positioning of respective switch and signal control levers and the actuation of a start button. To set up a route extending through the sections of trackway associated with several field stations, it is necessary that these detail operations be made for each of the field stations involved in the route.

According to the present invention, however, no switch and signal control levers are required on the control panel, but instead, push-pull buttons, or comparable route end designating means are provided at points along the track diagram corresponding to the location of the signals. To set up a route through the end of a passing siding constituting a field station, it is only necessary to actuate a button for the point of entrance and another button for the point of exit at that station. Relays for these respective points are picked up, together with a traffic direction relay, and the picking up of these three relays is effective to initiate the transmission of a code to the associated station selected to control the track switch and signals in accordance with the particular three relays that are energized.

It is further provided that a route of considerable length can be set up in response to end-to-end designation by operation of buttons on the track diagram where the designated entrance end is at one field station and the designated exit end is at another remote field station, and not necessarily at the next remote field station. The transmission of control codes for the establishment of an end-to-end route thus designated is initiated by the transmission of switch and signal control codes during a single cycle to the field station associated with the designated exit point. Upon the completion of the transmission of this cycle, a cycle is initiated for the field station adjoining toward the designated entrance point, and in this manner the route is built up in a cascade manner from the exit end, with single cycles being transmitted to the respective field stations successively to set up the route portion associated with the respective associated field stations until the end-to-end route becomes completely established between the remote entrance and exit points that have been designated.

The track switches are automatically operated to their normal or reverse positions in accordance with the positions required for the establishment of the routes having their route ends designated by the actuation of respective buttons on the track diagram. If it is desired to operate a track switch without clearing a signal, the switch control is designated by the actuation of a button for the signal associated with the siding if the switch is to be operated to its reverse position, or a button for the main track adjoining the siding is operated if the switch is to be operated to its normal position, and then a start button is actuated for the associated field station. To put a signal to stop, it is only necessary to actuate the start button for the associated field station.

An object of the present invention is to provide a centralized traffic control system in which routes are set up successively through the ends of passing sidings respectively associated with successively remotely spaced field stations between designated entrance and exit route ends associated with different remotely spaced field stations respectively.

Another object of the present invention is to operate a track switch to its normal or reverse position without clearing a signal in response to the manual actuation of a button for a selected one of the route ends together with a start button for the associated station.

Another object of the present invention is to be able to put a signal to stop by merely operating the start button for the associated field station.

Other objects, purposes and characteristic features of the present invention will be in part obvious from the accompanying drawings and in part pointed out as the description of the invention progresses.

Figure 2C:
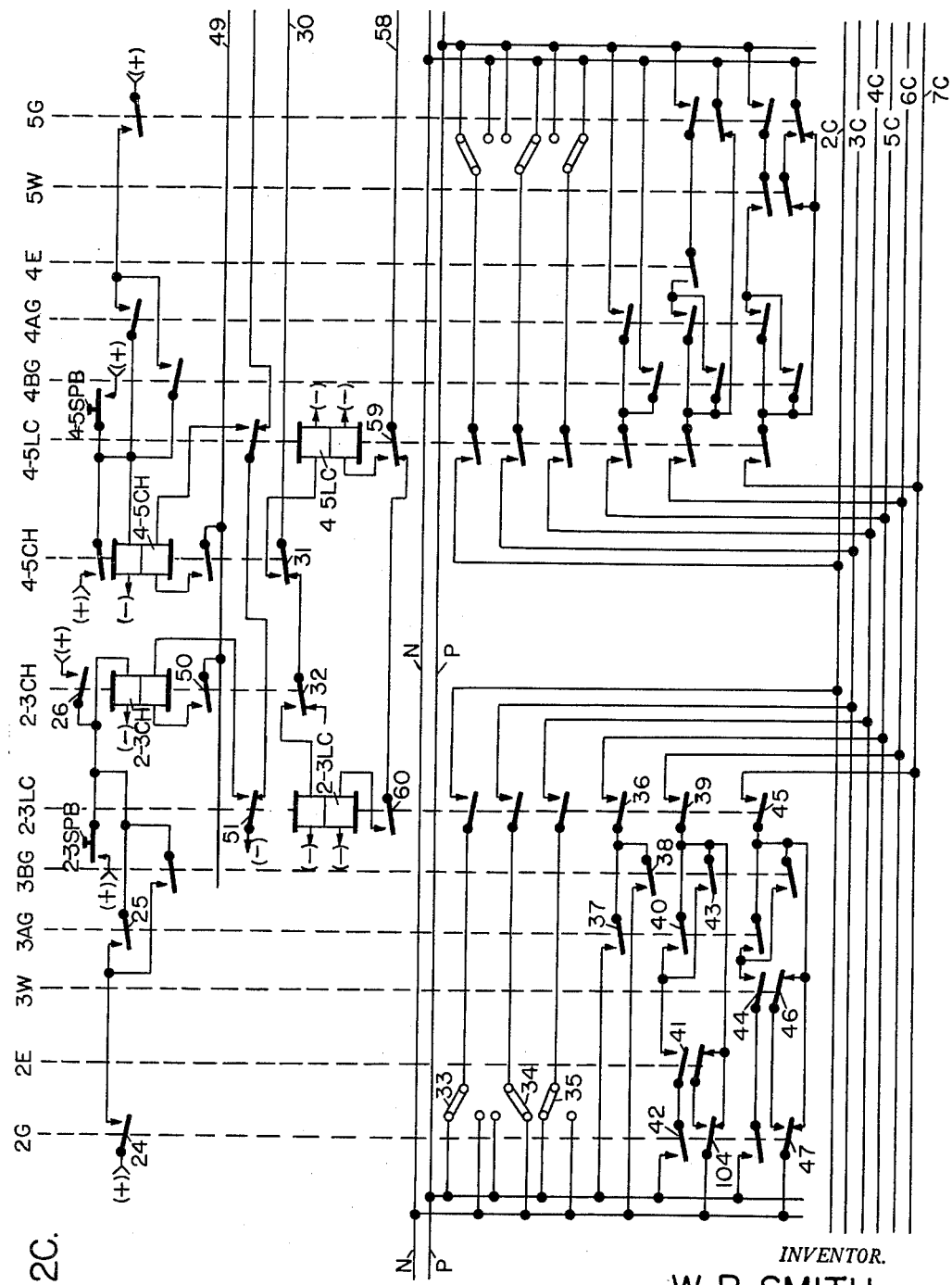
Figure 3:
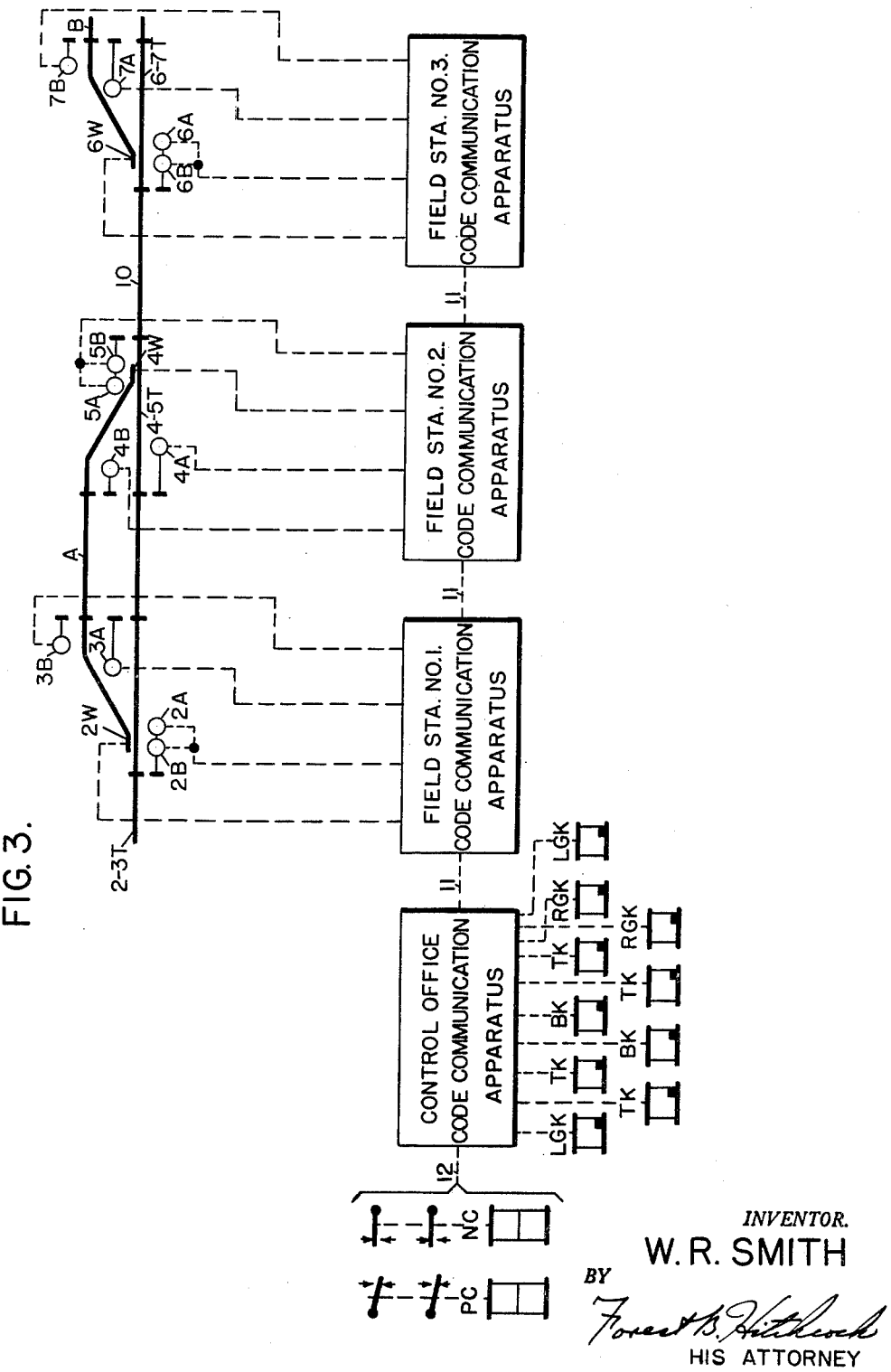
Figure 4:
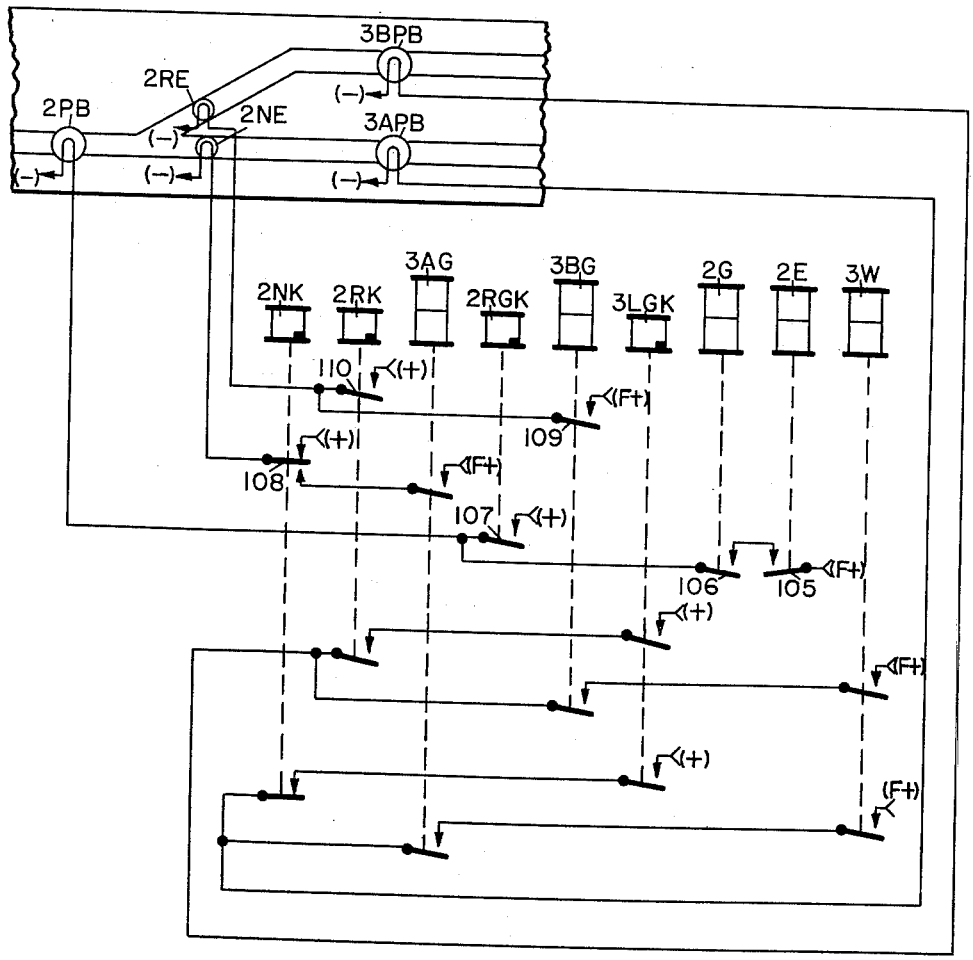

In describing the invention in detail, reference is made to the accompanying drawings in which corresponding parts are designated by similar reference characters, in which similar letter reference characters are used to designate parts having similar functions, and in which:

FIG. 1 is an elevational view of a section of a control panel of a centralized traffic control machine showing a track diagram of a section of the track layout for which the system is provided;

FIGS. 2A, 2B, 2C, and 2D when placed side by side respectively except that FIGS. 2C and 2D are placed below FIGS. 2A and 2B respectively, illustrate control office transmitting apparatus for the selection and transmission of codes to a plurality of field stations;

FIG. 3 illustrates apparatus for the reception of control codes at respective field stations as communicated from the control office, and for controlling switches and signals in a track layout in accordance with the codes received; and FIG. 4 illustrates a typical indication organization that may be provided at the control office for each of the field stations.

For the purpose of simplifying the illustrations and facilitating the explanation thereof, the various parts and circuits constituting this embodiment of the present invention are shown diagrammatically, and certain conventional illustrations are employed. The drawings have been made more with the purpose of facilitating the disclosure of the present invention as to its principles and mode of operation than for the purpose of illustrating the specific construction and arrangement of parts that would be employed in practice. Thus, the various relays and their contacts are illustrated in a conventional manner and the symbols (+) and (—) have been used to indicate connections to the respective positive and negative terminals of suitable batteries or other sources of direct current, and the symbol (F+) has been used to indicate the application of flashing energy from the positive terminal of a suitable source of direct current.

In the description of the present invention, a control cycle of operation is the term applied to a cycle of operation of the code communication system for the transmission of a control code from the control office to the field stations, the code comprising initially a group of code elements for selecting the station for which the controls are intended, secondly, a code element for indicating the position to which a track switch is to be operated, and thirdly, including one or more code elements used in controlling signals at the field station being called. Thus, it can be said that each control cycle is transmitted for a particular field station, because the control codes transmitted during a cycle are effective to control apparatus only at the station identified by the station selection code transmitted during the first part of the cycle.

Although the system can be provided for different types of track layouts, its is primarily intended to be used in connection with simple track layouts involving a stretch of single track with passing sidings associated therewith at intervals along the trackway as is illustrated in FIG. 3. The track layout according to FIG. 3 comprises a main track 10 having passing sidings A and B associated therewith. The left-hand end of passing siding A is connected to the main track 10 by a track switch 2W and the right-hand end of the passing siding A is connected to the main track 10 by a track switch 4W. Only the left-hand end of the passing siding B is illustrated, and this end is connected to the main track 10 by the track switch 6W.

Eastbound signals 2A and 2B, 4A and 4B, and 6A and 6B are provided for governing traffic through the track switches 2W, 4W and 6W respectively, and westbound signals 3A and 3B, 5A and 5B, and 7A and 7B are provided for governing traffic through the track switches 2W, 4W and 6W respectively.

It is to be understood that the system includes a suitable centralized traffic control machine (not shown) such as is well known in the art, for use at the control office in governing traffic through the track layout for which the system is provided. This machine has a suitable control panel, a portion of which is shown in FIG. 1, having a track diagram constructed thereon with suitable indicator lamps being disposed along the trackway of the diagram for keeping an operator informed of the occupancy of the various track sections and of the conditions of the track switches and signals. Typical indicator lamps for some of these purposes are illustrated in FIG. 4, and circuits are shown for the control of these indicator lamps in accordance with indications that are received over a suitable indicator communicating system from the respective field stations. It is to be understood that any suitable type of indication communicating system may be employed for the communication of these indications such as the indication communicating apparatus disclosed in the U.S. patent application of H. C. Sibley, Ser. No. 556,492, filed December 30, 1955, now U.S. Patent No. 2,794,179 granted May 28, 1957.

The track diagram on the control panel is constructed to correspond with the track layout for which the system is provided, and a push-pull button PB is located on the diagram, and preferably in the trackway of the diagram at each point corresponding to a signal location. Each of these push buttons PB is spring biased to a position in which all of its contacts are open, from which position it can either be pushed or pulled to close contacts in these respective positions. A button of this character can be constructed, for example, along the lines of the push button disclosed in the U.S. patent to J. F. Merkel, No. 2,305,185, dated December 15, 1942.

The system is readily adaptable for use with a number of different types of code communication apparatus, and inasmuch as code communication apparatus for centralized traffic control purposes is well known in the art, it is not considered necessary to disclose the details of such apparatus in the present application. This embodiment of the present invention is particularly adapted for use with the code communication system disclosed in the prior U.S. patent application of N. B. Coley, Ser. No. 563,637, filed February 6, 1956, now U.S. Patent No. 2,953,772 granted Sept. 20, 1960, and reference is to be made to this application for details of the system that are illustrated only by block diagram in this embodiment of the present invention.

The control office communication apparatus and the code communication apparatus at the respective field stations is connected by a suitable communication channel indicated in FIG. 3 by the dotted line 11. Relays PC and NC shown in FIG. 2D and in FIG. 3 are used for the transmission of respective positive and negative code characters, and their transmitting contacts are illustrated as being applied to the code communication apparatus by the dotted line 12 (see FIG. 3).

At the control office, a change relay CH (see FIGS. 2C and 2D), and a code determining relay LC is provided for each of the field stations. Associated with the control of the relays CH and LC are system relays LCP and LCPP which are used to provide that only a single relay LC can be picked up at one time and for a single cycle of operation of the code communication apparatus. The relay LCP is normally maintained in its picked up position and it is dropped away upon initiation of a cycle of operation and remains dropped away until the end of the cycle. The relay LCPP is picked up upon initiation of each cycle of operation, and is maintained picked up until the end of the cycle. For detail consideration of the circuits involved in the control of these relays, reference is to be made to the above mentioned U.S. patent application of N. B. Coley, Ser. No. 563,637, filed February 6, 1956.

A relay G is provided at the control office for each of the signal locations. Thus relay 2G is provided for signal 2 (see FIG. 2A), relay 3AG is provided for the location of signal 3A and relay 3BG is provided for the location of signal 3B. These relays are associated with signals governed by field station No. 1 which is associated with the left-hand end of the passing siding A, and in addition to these relays G being provided for the respective signal locations, relays 2E and 3W are provided for defining east and west directions of traffic respectively. This group of relays that has been described as being associated with the left-hand end of the passing siding A, and field station No. 1, is typical of the group of relays that is provided at the control office for each of the other field stations as being associated with signal locations at the various passing siding ends.

Various magnetic stick indication relays are provided at the control office for indicating the conditions of occupancy of the different track sections and of the blocks and of the conditions of the switches and signals at the various field stations, these relays being controlled by indication code communication apparatus such as has already been referred to as having been disclosed, for example, in the above mentioned U.S. patent application of H. C. Sibley, Ser. No. 556,492, filed December 30, 1955. These relays being of the magnetic stick type are maintained in their last actuated positions until acted upon to change their positions by a pulse communicated over the code communication system. Thus, the magnetic stick relays 2–3TK, 4–5TK and 6–7TK are provided for the detector track sections 2–3T, 4–5T and 6–7T at field stations 1, 2 and 3 respectively. These relays when in their dropped away position as indicated are positioned in accordance with their respective associated track sections being unoccupied. Block indication relays 3–4BK and 5–6BK are provided for the stretches of track between the field stations respectively for indicating the conditions of occupancy of such stretches. These relays when in their dropped away positions indicate that the associated blocks are unoccupied.

Magnetic stick relays LGK and RGK are provided for each of the field stations for the purpose of indicating the condition of the signals at the associated stations. If a signal is clear for governing eastbound traffic, the relay RGK for that station is picked up, and if a signal is clear for governing westbound traffic, a relay LGK for that station is picked up. These relays LGK and RGK are illustrated as being normally in their dropped away positions as indicative of the signals being normally at stop.

With reference to FIG. 4, magnetic stick switch indication relays 2NK and 2RK are provided at the control office for indicating the position of the track switch 2W, and it is to be understood that other similar switch indication relays (not shown) are provided for indicating the positions of the other track switches. Relay 2NK is picked up when its associated track switch 2W is in its normal position, and relay 2RK is picked up when its associated track switch 2W is in its reverse position.

Having thus considered the organization of the system in general, a consideration in details as to the circuits involved for the control of the respective relays will be hereinafter given when considering the mode of operation of the system under typical operations.

OPERATION

With no trains present in the track layout and no routes established for trains, the system is said to be in a state conveniently called "normal conditions." Thus, under normal conditions all of the relays are in their dropped away positions as illustrated in the drawings except for the relay LCP at the control office (see FIG. 2D) which is normally picked up as has been heretofore described, and the relay NC at the control office which is normally picked up to apply negative polarity of energization to the line circuit extending to the field stations. One or the other of the switch indication relays NK or RK (see FIG. 4) is in its picked up position for each track switch under normal conditions in correspondence with the position of the associated track switch.

Local route establishment

Before considering the mode of operation of the system in establishing a through route by end-to-end operation, consideration will be given as to the mode of operation in setting up a local route at a single field station. An example of such a route would be to establish a route through the track switch 2W in its normal position at field station No. 1, or to establish a route through such track switch in its reverse position.

If it is desired to set up a route for the clearing of signal 2A (see FIG. 3) for governing traffic through the track switch 2W in its normal position, an operator first pushes the button 2PB (see FIG. 1) to cause the picking up of relay 2G (see FIG. 2A). Relay 2G is energized through contact 13 of button 2PB in its depressed position, back contact 14 of relay 2E, and lower winding of relay 2G. This relay when picked up is maintained energized by a stick circuit for the energization of its upper winding which is closed through back contact 15 of relay 2-3LC and front contact 16 of relay 2G. Front contact 17 of relay 2-3CH is connected in multiple with back contact 15 of relay 2-3LC so as to maintain energy on the stick circuit for relay 2G until the end of a cycle of operation for transmission to field station No. 1 as will be more readily apparent as the description of the invention progresses.

Upon the picking up of relay 2G, the relay 2E is picked up in accordance with the route having been initiated for an eastbound train. This relay is picked up by the energization of its lower winding through front contact 18 of relay 2G and through back contact 19 of relay 3W.

The operator then designates the exit end of the route by pulling out the button 3APB, and the pulling out of this button, with the relay 2E in its picked-up position, causes the picking up of relay 3AG by the energization of its lower winding through contact 20 of button 3APB in its pulled-out position, front contact 21 of relay 2E, and back contact 22 of relay 3BG. This relay when picked up is maintained energized by a stick circuit for its upper winding including back contact 15 of relay 2-3LC connected in multiple with front contact 17 of relay 2-3CH and front contact 23 of relay 3AG.

With relays 2G and 3AG both in their picked-up positions, a circuit is closed by which the change relay 2-3CH is picked up for the initiation of the transmission of a cycle of operation for the communication of controls to field station No. 1. The upper winding of relay 2-3CH is energized at this time through front contact 24 of relay 2G and front contact 25 of relay 3AG. This relay when picked up is maintained energized by a direct stick circuit through its front contact 26 until close to the end of the cycle of operation, at which time it is driven down by energization of its lower winding with opposite polarity.

The picking up of relay 2-3CH causes the picking up of its associated relay 2-3LC. Relay 2-3LC is picked up by the energization of a circuit extending from (+), including back contact 27 of relay LCPP (see FIG. 2C), front contact 28 of relay LCP, back contact 29 of relay 6-7CH, wire 30, back contact 31 of relay 4-5CH, front contact 32 of relay 2-3CH, and upper winding of relay 2-3LC, to (−). Relay 2-3LC when picked up causes the dropping away of relay LCP and the picking up of relay LCPP successively and a cycle of operation is initiated for transmission of switch and signal control codes to field station No. 1 which are selected in accordance with the energized condition of the relays 2G, 3AG and 2E.

The code characters transmitted are respectively (+) or (−) in accordance with the energization selectively of the N and P buses which govern the code transmitting relays NC and PC respectively.

During the first part of the cycle, the first three elements of the code transmitted are for station selection purposes, and these elements are determined, with relay 2-3LC picked up, by the positions of the jumpers 33, 34 and 35 for the first three elements of the code respectively. With these jumpers positioned as illustrated in FIG. 2C, the station code transmitted is a three element code having the characters (+)(−)(+), which is the code that is assumed to be assigned to field station No. 1.

The next following element of the code is used for the control of the track switch 2W, and this element is (+) for operation of the track switch to its normal position if relay 3AG is picked up as has been assumed, but if the route designated requires the track switch 2W to be in its reverse position, the fourth element of the code is negative because of the relay 3BG being picked up under these conditions rather than the relay 3AG. Thus during the particular step of the cycle during which energy is applied to the control wire 5C in the scanning of the control buses C by the stepping apparatus, relay PC becomes picked up by the energization of its lower winding from control wire 5C through front contact 36 of relay 2-3LC, front contact 37 of relay 3AG, and positive bus P. If the position of the track switch were required to be reverse, the relay NC would be energized from the N bus through front contact 38 of relay 3BG rather than the P bus being energized through front contact 37 of relay 3AG.

The fifth element of the code is used for the control of signal 2 for governing eastbound traffic and a control for clearing this signal is transmitted during the sixth step provided that the relay PC is picked up by the energization of the P bus for the transmission of a positive code element. If a negative code element is transmitted as the fifth element of the code, the signal control for the eastbound signal 2 is such as to cause that signal to remain at stop or to be put to stop if it is already clear. Thus, under the assumed conditions with the relays 2G, 2E and 3AG picked up, the relay PC is picked up for the transmission of a positive code element as the fifth element of the code because of energy applied to the P bus from wire 6C through front contact 39 of relay 2-3LC, front contact 40 of relay 3AG, front contact 41 of relay 2E, and front contact 42 of relay 2G. If the route had been designated as extending over the track switch 2W in its reverse position, the P bus still would have been energized because of the connection of front contact 43 of relay 3BG in multiple with front contact 40 of relay 3AG.

The sixth element of the code is used for the control of a signal governing westbound traffic, and inasmuch as the relay 3W is not picked up under the assumed conditions for the establishment of eastbound traffic, the circuits comparable to those described for the energization of the P bus for transmission of the sixth element of the code is prevented by reason of the front contact 44 of relay 3W being opened.

Thus, a negative code element is transmitted as the sixth element of the code because of eastbound traffic being established and because of the energization of the relay NC from control wire 7C through front contact 45 of relay 2–3LC, back contact 46 of relay 3W, front contact 47 of relay 2G, and N bus.

Relay LCP becomes picked up subsequent to the transmission of the above controls during a cycle of operation as is shown and described in detail in the above mentioned U.S. patent application of N. B. Coley, Ser. No. 563,637, filed February 6, 1956, and the picking up of this relay before the relay LCPP is dropped away closes a momentary drive down circuit for the relays CH so that the relay 2–3CH is actuated to its dropped away position. This circuit extends from (+), including front contact 27 of relay LCPP (see FIG. 2D), front contact 48 of relay LCP, wire 49, front contact 50 of relay 2–3CH, lower winding of relay 2–3CH, and front contact 51 of relay 2–3LC, to (−). Relay 2–3LC, however, is maintained energized until the last step is taken by the counter wherein relay 2V becomes dropped away, and relay 1V is maintained picked up. At all other times during the cycle, energy is applied to wire 52 (see FIG. 2D) either through front contact 53 of relay 4V, front contact 54 of relay 3V, back contact 55 of relay 1V or front contact 56 of relay 2V. Energy from one or the other of these contacts feeds from wire 52 through back contact 57 of relay 6–7LC, wire 58, back contact 59 of relay 4–5LC, front contact 60 of relay 2–3LC and lower winding of relay 2–3LC. After the relay 2–3LC has had time to drop away, the relay 1V is dropped away as the final operation of the counting relays, and the dropping away of relay 1V causes the dropping away of relay LCPP to complete the restoration to the normally at rest condition of the code communication apparatus.

The relays 2G and 3AG (see FIG. 2A) which are maintained in their energized condition during the cycle, are dropped away upon the dropping away of relay 2–3CH after the transmission of the control code during the cycle and prior to the dropping away of relay 2–3LC to close its back contact 15. Relay 2E is dropped away upon the opening of its circuit at front contact 18 by the dropping away of relay 2G.

*End-to-end route establishment*

For consideration of the mode of operation of the system in response to end-to-end route designation, it will be assumed that the push button 2PB is pushed for designation of the entrance end of an end-to-end route, and that the button 7BPB is pulled out for designation of the exit end-to-end route to establish a route from signal 2 through track switches 2W and 4W in their normal positions and through track switch 6W in its reverse position in order to take a train into the passing siding B.

In response to the entrance designation, the relays 2G and 2E are picked up for the energization of circuits that have been described, and the picking up of relay 2E closes a circuit for picking up relay 4E which is associated with field station No. 2, provided that there is no train in the block between ends of the passing siding A on the main track, and provided that there are no routes established through this section. The circuit for the energization of relay 4E extends from (+), including front contact 61 of relay 2E, back contact 62 of relay 3W, back contact 63 of relay 3AG, back contact 64 of relay 3BG, back contact 65 of relay 3–4BK, back contact 66 of relay 4–5TK, back contact 67 of relay 4RGK, back contact 68 of relay 4BG, back contact 69 of relay 4AG, and lower winding of relay 4E, to (−).

Relay 4E when picked up feeds energy through a similar checking circuit to check that there is no train in the block between the passing sidings A and B and that no routes are established therein and if these conditions are met, the relay 6E becomes picked up. The circuit for the energization of relay 6E extends from (+), including front contact 70 of relay 4E, back contacts 71 and 72 of relays 5W and 5G respectively, wire 73, back contacts 74, 75, 76 and 77 of relays 5LGK, 4–5TK, 5–6BK, and 6G respectively, and lower winding of relay 6E, to (−).

If the CTC territory extends beyond this point, a similar relay E is picked up in a similar manner for each of the field stations so far as the trackway is unoccupied by a train, or no prior route has been established. By the operation of a stick relay E associated with each of the field stations that can be included in a route emanating from the designated entrance point, each of these field stations is conditioned so that the actuation of a button PB for designation of an exit point at one of these field stations will be effective to cause the setting up of the complete route end-to-end from the designated entrance point to the designated exit point.

In pulling out the button 7BPB for designation of an exit point under the assumed conditions, the relay 7BG (see FIG. 2B) which is associated with that button becomes picked up because of the relay 6E being in its energized position to indicate that a route is available extending from the entrance point that has been designated. The circuit by which relay 7BG is picked up extends from (+), including contact 78 of button 7BPB, front contact 79 of relay 6E, back contact 80 of relay 7AG, and lower winding of relay 7BG, to (−). This relay when picked up is maintained energized by a stick circuit comparable to that described for maintaining relay 3BG energized including back contact 81 of relay 6–7LC connected in multiple with front contact 82 of relay 6–7CH.

Upon the picking up of relay 7BG, with relay 6E in its picked up position, relay 6G becomes picked up by the energization of a circuit extending from (+), including front contact 83 of relay 7BG connected in multiple with front contact 84 of relay 7AG, front contact 85 of relay 6E, and lower winding of relay 6G, to (−). With the relays 6G and 7BG picked up, the change relay 6–7CH is picked up for initiation of the cycle by its energization through front contact 86 of relay 6G and front contact 87 of relay 7BG connected in multiple with front contact 88 of relay 7AG. The initiation of a cycle of operation and the selection of a code for transmission is accomplished in the same manner as that which has been described when considering the mode of operation under typical conditions relative to local route establishment.

Upon the picking up of relay 6–7LC at the beginning of the cycle for transmission to field station No. 3, energy is applied to a circuit for the picking up of relay 5G which is associated with field station No. 2 extending from (+) including front contact 89 of relay 6–7LC, wire 90, front contact 91 of relay 4E, and lower winding of relay 5G, to (−).

Relay 5G when picked up, with the directional relay 4E picked up as has been described, closes a circuit for picking up relay 4AG extending from (+), including front contact 93 of relay 5G, front contact 94 of relay 4E, lower winding of relay 4AG, and back contact 95 of relay 4BG, to (−). Thus with the relays 5G, 4E and 4AG in their picked up positions, the conditions are established for the picking up of relay 4–5CH for the initiation of the following cycle for transmission of route controls to field station No. 2 for setting up the route through the track switch 4W in its normal position and for clearing signal 4A. Relay 4–5LC cannot be picked up for this second cycle of operation until the termination of the first cycle so as to cause relay LCP (see FIG. 2D) to be restored to its picked up position and the relay LCPP to be dropped away. It will be noted that although there is a momentary interruption of the stick circuits for the relays 6G and 7BG when relay 6–7CH is dropped away prior to the dropping away of relay 6–7LC, there is no interruption in the stick circuits for the relays associated with field station No. 2 which are dependent for their stick circuit energization on front contact 96 of relay 4–5CH connected in multiple with back contact 97 of relay 4–5LC. Thus the relays 6G and 7BG are dropped away at the end of the first cycle but the relays 5G and 4AG which have been picked up during the first cycle to select the code for the second cycle are maintained energized until the end of the second cycle.

When the relay 4–5LC is picked up for initiation of the second cycle, a circuit is closed for the picking up of relay 3AG which is associated with field station No. 1 to condition the apparatus associated with that field station for the initiation of a third cycle. The circuit by which relay 3AG is picked up at this time extends from (+), including front contact 98 of relay 4–5LC, front contact 21 of relay 2E, lower winding of relay 3AG, and back contact 22 of relay 3BG, to (−). It will be apparent that the relays 2G, 2E and 3AG in their energized conditions as provided by the above described end-to-end operation is comparable to the condition of these relays in response to the actuation of the buttons 2PB and 3ARP for the designation of a local route as has been heretofore considered. Thus, when the code communication apparatus has completed the transmission of the second cycle for field station No. 2, a third cycle is immediately initiated for the transmission of a cycle of operation for field station No. 1 to complete the establishment of the through route from signal 2 to the passing siding B.

Having thus described the mode of operation of the system in setting up a typical route by end-to-end operation for eastbound traffic, because of the circuits being symmetrical, it will be readily apparent that a similar mode of operation is accomplished for the setting up of through routes for westbound traffic, the energization of directional relays W being effective for setting up routes for westbound traffic as compared to the energization of the relays E in the setting up of eastbound traffic.

*Switch operation*

It is at times desirable to be able to operate the respective track switches without clearing a signal for purposes, for example, as to free them of ice and snow or other obstructions. Such operation can be accomplished by the operation of the buttons more particularly associated with the passing sidings, and with the main stretch of track adjoining the passing sidings. Thus, for example, the operation of the button 3BPB (see FIG. 1) calls for the track switch 2W to be operated to its reverse position, and the operation of the pushbutton 3APB calls for the operation of the track switch 2W to its normal position. The operation of these buttons for designation of the respective reverse and normal positions for operation of the track switch 2W selects the switch code to be transmitted to the field station No. 1 by the energization of relay 3BG or 3AG respectively, but the transmission of a cycle for transmission of the control codes selected is initiated only after actuation of the start button 2–3SPB.

To consider the mode of operation more specifically, assuming that the system is initially in its normal condition, the pushing of the button 3BPB causes the picking up of relay 3BG (see FIG. 2A) by the energization of a circuit extending from (+), including contact 99 of button 3BPB in its depressed position, back contact 100 of relay 3W, back contact 101 of relay 3AG and lower winding of relay 3BG, to (−). The subsequent pushing of the start button 2–3SPB (see FIG. 2C) closes an obvious circuit for the energization of the upper winding of relay 2–3CH, and the picking up of relay 2–3CH causes the transmission of a control cycle for field station No. 1 in a manner such as has been heretofore described. The fourth element of the code which is used for switch control purposes will be a negative element because of the connection of wire 5C to the N bus through front contact 36 of relay 2–3LC and front contact 38 of relay 3BG. Restoration of the relays to their normal conditions at the end of the cycle is accomplished in the same manner as has been described.

In case the switch control to be transmitted is for the operation of the track switch 2W to its normal position, push button 3APB (see FIG. 1) is depressed rather than the button 3BPB, prior to the actuation of the start button 2–3SPB and the relay 3AG (see FIG. 2A) is picked up by the energization of a circuit including contact 102 of button 3APB, back contact 103 of relay 3W, lower winding of relay 3AG, and back contact 22 of relay 3BG. The fourth element of the code is a positive element because of energy applied to the P bus (see FIG. 2C) from wire 5C through front contacts 36 of relay 2–3LC and front contact 37 of relay 3AG.

It will be noted that no signal clearing code is transmitted during the transmission of the switch controls as described above because of the relay 2G being in its dropped away position. Thus, it is provided that the fifth and sixth elements of the code are negative, thus calling for both eastbound and westbound signals to be at stop. The fifth element of the code is negative because of the connection of wire 6C to the N bus through front contact 39 of relay 2–3LC and back contact 104 of relay 2G. The sixth element of the code is negative because of the connection of wire 7C through front contact 45 of relay 2–3LC and through back contact 47 of relay 2G.

*Putting a signal to stop*

It is to be understood that the control circuits in the field can be provided in a conventional manner to provide for stick signal operation as is shown in the control of the relays 10–14RGZ and 10–14LGZ of FIG. 2C in the above mentioned prior application of N. B. Coley, Ser. No. 563,637 filed February 6, 1956. According to this organization, the signals are put to stop automatically as they are accepted by respective approaching trains. When it is desired to put a signal to stop manually from the control office, it is necessary only to actuate the start button SPB for the field station at which the signal is to be put to stop.

Thus, for example, if it is assumed that signal 2 is clear for governing eastbound traffic, this signal can be put to stop by the actuation of the start button 2–3SPB (see FIG. 1). The actuation of this button causes the picking up of the change relay 2–3CH (see FIG. 2C) in an obvious manner, and this relay when picked up initiates the transmission of a cycle of operation for field station No. 1. Because of the relay 2G being in its deenergized position during this cycle, it is selected as has been heretofore described that the fifth and sixth elements of the code are negative, and in accordance with these elements being negative, the above mentioned relays 10–14RGZ and 10–14LGZ are respectively energized with a polarity to actuate them to their dropped away positions, thus restoring signal 2 to stop.

*Indications*

Although different forms of indications may be used with the pushbutton control system provided according to the present invention, one form of indication system is shown as typical in FIG. 4 for the indications provided at the control office on the track diagram for indicating conditions at field station No. 1.

According to this indication system, upon the pushing of the button 2PB for the designation of an entrance point for a route, a lamp within the pushbutton 2PB is flashed by the application of flashing energy to a circuit (see FIG. 4) including front contact 105 of relay 2E and front contact 106 of relay 2G. When a route having this as an entrance point is completely established and the signal 2 governing entrance to the route is cleared, the signal indication relay 2RGK is picked up by an indication transmitted from field station No. 1 to the control office, and the picking up of this relay closes front contact 107 to apply steady energization to the lamp in the button 2PB.

For switch indication, separate lamps 2RE and 2NE are provided for indicating the reverse and normal positions of the track switch 2W respectively, and these lamps are energized in accordance with the particular magnetic stick indication relays 2RK and 2NK being in a picked up position. It is assumed that the track switch is in its normal position under normal conditions and thus the relay 2NK is indicated as being normally picked up and it provides for steady energization of the lamp 2NE through front contact 108. If a reverse control has been called for for transmission to field station No. 1 for the operation of the track switch 2W to its reverse position, the picking up of relay 3BG is effective to apply flashing energy through front contact 109 to the lamp 2RE to indicate that a control has been designated for operation of the track switch. When an indication is received from field station No. 1 that the track switch has completed its operation, relay 2RK is picked up to apply steady energization through front contact 110 to the lamp 2RE. The lamp 2NE is extinguished upon reception of an indication that the track switch is no longer in its normal position whereby front contact 108 of relay 2NK is opened.

Having thus described a centralized traffic control system having pushbutton operation on a track diagram at a control office for a particular simple portion of a track layout as one embodiment of the present invention, it is to be understood that this form was chosen for a disclosure of the invention to facilitate the disclosure rather than to limit the number of forms the invention may assume and it is to be further understood that various adaptations, modifications and alterations may be made to the specific form shown within the scope of the appending claims.

What I claim is:

1. A normally at rest centralized traffic control system for governing track switches and signals at each of several remotely spaced field stations from a control office comprising, normally at rest code communication means for communicating selected switch and signal control codes from the control office to the field stations during respective cycles of operation when initiated, each of said cycles comprising the transmission from the control office of a code for station selection and selected switch and signal control codes for a selected field station, a control panel at the control office having disposed thereon control switches for the several signals at the respective field stations for designation of the respective entrance and exit ends of routes, cycle initiating means at the control office for initiating said code communication means into a cycle of operation for transmission of codes to the several field stations selectively, said cycle initiating means including switch repeater means for the several control switches actuated in response to the actuation of the associated respective control switches and maintained actuated after restoration of the associated respective control switches to their normal positions for storing the designations of the designated ends of routes to be established, said cycle initiating means including traffic direction registration means for both directions of traffic for each of the field stations for registering and storing respective directions of traffic for routes to be established, said traffic direction registration means for the entering station being actuated in response to the actuation of said switch repeater means by a control switch for the associated station and also by the traffic direction registration means for succeeding stations provided there has been no conflicting traffic direction established between the initial and the succeeding stations, and means responsive to the actuation of said switch repeater means for designating the exit end of a route following the designation of the entrance end for initiating cycles of operation of the code communication system for all field stations included in a route extending between the ends designated starting with the field station at the exit end of the route, provided that the traffic direction means for the corresponding direction has been actuated for that station.

2. A normally at rest centralized traffic control system according to claim 1 wherein said switch repeater means includes relays for the associated control switches energized upon actuation of the associated switches.

3. A normally at rest centralized traffic control system according to claim 2 wherein said traffic direction registering means includes a traffic direction relay for each direction of traffic at each of the field stations which is selectively energized when the entering end of a route is designated by actuation of one of said control switches for the associated station.

4. A normally at rest centralized traffic control system according to claim 3 wherein at least one of the repeater relays can also be energized by actuation of a different control switch for the associated station provided that a particular one of the traffic direction relays is energized.

5. A normally at rest centralized traffic control system for governing track switches and signals at each of several remotely spaced field stations along a stretch of track from a control office comprising, normally at rest communication means for communicating selected switch and signal control codes from the control office to the field stations during respective cycles of operation when initiated, each of said cycles comprising the transmission from the control office of a code for station selection and selected switch and signal control codes for a selected field station, a control panel at the control office having disposed thereon a diagram of said stretch of track having self-restoring control buttons disposed thereon at points comparable to signal locations at the several field stations for designation of the respective entrance and exit ends of routes, cycle initiating means at the control office for initiating said code communication means into a cycle of operation for transmission of codes to the several field stations selectively, said cycle initiating means including push button repeater relays for the several push buttons for storing the designation of the ends of routes to be established, means for energizing the push button repeater relays in response to the actuation of the respective push buttons and for maintaining the respective push button repeater relays energized after restoration of the associated respective push buttons to their normal positions, said cycle initiating means including traffic direction registration relays for both directions of traffic for each of the field stations for registering and storing respective directions of traffic for routes to be established, means for energizing one of said traffic direction registration relays in response to the actuation of said push button repeater relay for the associated station and for energizing traffic direction relays for succeeding stations provided there has been no conflicting traffic direction established between the initial and the succeeding stations, and means responsive to the actuation of said push button repeater relays for designating the exit end of a route following the designation of the entrance end for initiating cycles of operation of the code communication system for all field stations included in a route extending between the ends designated starting with the field station at the exit end of the route, provided that the traffic direction means for the corresponding direction has been actuated for that station.

6. A normally at rest centralized traffic control system according to claim 5 wherein initiation of code transmission is rendered effective for transmission to all intermediate stations in a through route in response to the designation of only the entrance and exit ends of such route by actuation of said self-restoring control buttons for the signals at such ends.

References Cited in the file of this patent

UNITED STATES PATENTS

| | | |
|---|---|---|
| 2,082,544 | Judge | June 1, 1937 |
| 2,223,126 | Phinney | Nov. 26, 1940 |
| 2,265,259 | Wynn | Dec. 9, 1941 |
| 2,357,546 | Preston | Sept. 5, 1944 |
| 2,576,038 | Pascoe | Nov. 20, 1951 |
| 2,671,164 | Judge | Mar. 2, 1954 |